US005271689A

United States Patent [19]

Ishii et al.

[11] Patent Number: 5,271,689

[45] Date of Patent: Dec. 21, 1993

[54] THREAD FASTENING TYPE CONNECTOR ASSEMBLY

[75] Inventors: Takashi Ishii; Takashi Sone, both of Shizuoka, Japan

[73] Assignee: Yazaki Corporation, Tokyo, Japan

[21] Appl. No.: 886,084

[22] Filed: May 21, 1992

[30] Foreign Application Priority Data

May 21, 1991 [JP] Japan ................................ 3-115874

[51] Int. Cl.[5] ............................................ H01R 13/00

[52] U.S. Cl. ............................ 403/408.1; 403/405.1; 403/344; 403/27; 403/2

[58] Field of Search .................. 403/2, 27, 13, 12, 49, 403/292, 344, 376, 405.1, 406.1, 407.1, 408.1

[56] References Cited

U.S. PATENT DOCUMENTS

| | | | |
|---|---|---|---|
| 1,901,377 | 3/1933 | Roe | 403/344 |
| 4,627,759 | 12/1986 | Kato et al. . | |
| 4,629,351 | 12/1986 | Kato | 403/405.1 |
| 4,666,325 | 5/1987 | Vantouroux | 403/405.1 |
| 4,898,493 | 2/1990 | Blankenburg | 403/407.1 |
| 4,957,449 | 9/1990 | Hatagishi . | |
| 5,178,479 | 1/1993 | Brown | 403/406.1 |

FOREIGN PATENT DOCUMENTS 62-188188 8/1987 Japan .

*Primary Examiner*—Randolph A. Reese
*Assistant Examiner*—Anthony Knight
*Attorney, Agent, or Firm*—Sughrue, Mion, Zinn, Macpeak & Seas

[57] ABSTRACT

A connector assembly in which a first connector housing is secured to a second connector housing using a bolt and nut arrangement. The assembly includes a bolt which extends through the first connector housing and is threadably engaged with a nut disposed in the second connector housing; and a depressing flange formed on the shank of the bolt for abutting against the first connector housing. According to at least one embodiment of the invention, a bolt holder is mounted on the bolt between the bolt head and the depressing flange to retain the bolt to the first connector housing. The bolt holder includes either a single member having a bolt hole, and a bolt inserting slot communicated with the bolt hole and having a width smaller than the diameter of the bolt, or two individual members which define a bolt hole when combined together to retain the bolt therein.

7 Claims, 5 Drawing Sheets 7 14 h 16 13 8 18 9 5 2 15 11 1

7
8
9
5
4
3
2
12
11
11a
6
1
10

14
7
13
A
B
17
B
2
A
1

7
14
h
16
8
13
18
9
5
2
15
11
1

16
d
18
8
13
17
s

19
C
22
24
25
C
23

7'
19
2'
27
26
28
1'

23
25
21
20
19
22
24
23
25

THREAD FASTENING TYPE CONNECTOR ASSEMBLY

BACKGROUND OF THE INVENTION

1. Field of the Invention

This invention relates to a thread fastening type connector assembly comprising two connectors which are fastened to each other utilizing a bolt and nut arrangement.

2. Background

A conventional thread fastening type connector assembly is disclosed in Japanese Patent Application (OPI) No. 188188/1987 (the term "OPI" as used herein means an "unexamined published application"), and illustrated in FIGS. 8 and 9. The connector comprises a male connector 32 and a female connector 33 engageable with the male connector. The male connector 32 has a center portion 34 in which a nut 35 is fixed, and a plurality of terminal accommodating chambers 52 in which female terminals 36 are disposed. The female connector 33 includes a bolt 37 extending along the longitudinal axis of the connector and aligned with the nut 35 in the male connector 32, and a plurality of terminal accommodating chambers 38 in which male terminals 39 are disposed. In order to facilitate the threaded engagement of the bolt 37 with the nut 35, the shank 40 of the bolt 37 extends through a bolt holder 41 made of synthetic resin. As shown in FIG. 9, the bolt holder 41 is disposed within a central opening 43 formed in the housing 42 of the female connector 33, and is engaged therewith by means of protrusions 44 and 44 engaged in locking grooves 45 and 45 formed in the housing 42.

In the thread fastening type connector assembly, a connector engagement detecting rod 46 is axially disposed within a bore provided in the bolt holder 41. When the male connector 32 and the female connector 33 are engaged with each other, the detecting rod 46 is urged upwardly by the center portion 34 of the male connector 32 so as to protrude from a through-hole 47 thereby indicating to the operator that complete engagement of the connectors has been accomplished. Therefore, the operator will not excessively tighten the connectors to each other.

As another means for preventing excessive tightening of the connectors to each other, a breaking recess 48 is formed in the shank 40 of the bolt 37 so that the shank will shear if too much torsional force is applied. To retain the bolt in a predetermined axial position, a locking ring 50 is secured to the bolt 37 between the shank 40 and the threaded portion 49, as illustrated. A washer 52 is mounted on the bolt 37 just below the head 51. Thus, as the bolt 37 is tightened, the force of the head 51 is applied through the washer 52 against the bolt holder 41, so that the female connector 33 is engaged with the male connector 32.

In the conventional thread fastening type connector assembly thus designed, the tightening force of the bolt 37 is directly applied to the bolt holder 41 and, therefore, it is necessary to use an expensive material such as a glass-fiber reinforced PBT (polybutyleneterephthalate) resin to form the bolt holder 41; that is, the bolt holder 41 must be high both in mechanical strength and rigidity. Thus, the conventional thread fastening type connector assembly is relatively high in manufacturing cost.

SUMMARY OF THE INVENTION

Accordingly, an object of this invention is to eliminate the above-described difficulties accompanying a conventional thread fastening type connector assembly.

More specifically, an object of the invention is to provide a thread fastening type connector assembly in which the tightening force of the operating bolt is not applied to the bolt holder such that the bolt holder can be made of a relatively inexpensive material.

The foregoing object and other objects of the invention have been achieved by the provision of a thread fastening type connector assembly in which a bolt extended through a first connector is threadably engaged with a nut in a second connector, to engage the first connector with the second connector. According to the invention, the bolt has a depressing flange on its shank, and the bolt is tightened with the depressing flange abutted against the housing of the first connector.

When the bolt is tightened, the depressing flange of the bolt directly pushes the housing of the first connector. Hence, the bolt holder may be low in rigidity. For instance, the bolt can be tightened without the bolt holder.

The nature, utility and principle of the invention will be more clearly understood from the following detailed description and the appended claims when read in conjunction with the accompanying drawings.

DETAILED DESCRIPTION OF THE PREFERRED EMBODIMENTS

Preferred embodiments of this invention will be described with reference to the accompanying drawings.

A first embodiment of the invention will be described with reference to FIG. 1. Although the connector assembly comprises a male connector and a female connector similarly as in the case of the above-described conventional connector assembly, for the purpose of simplicity, FIG. 1 only illustrates the female connector, it being understood that the male connector and the male terminals are the same as those in the conventional thread fastening type connector assembly.

Figure 1:
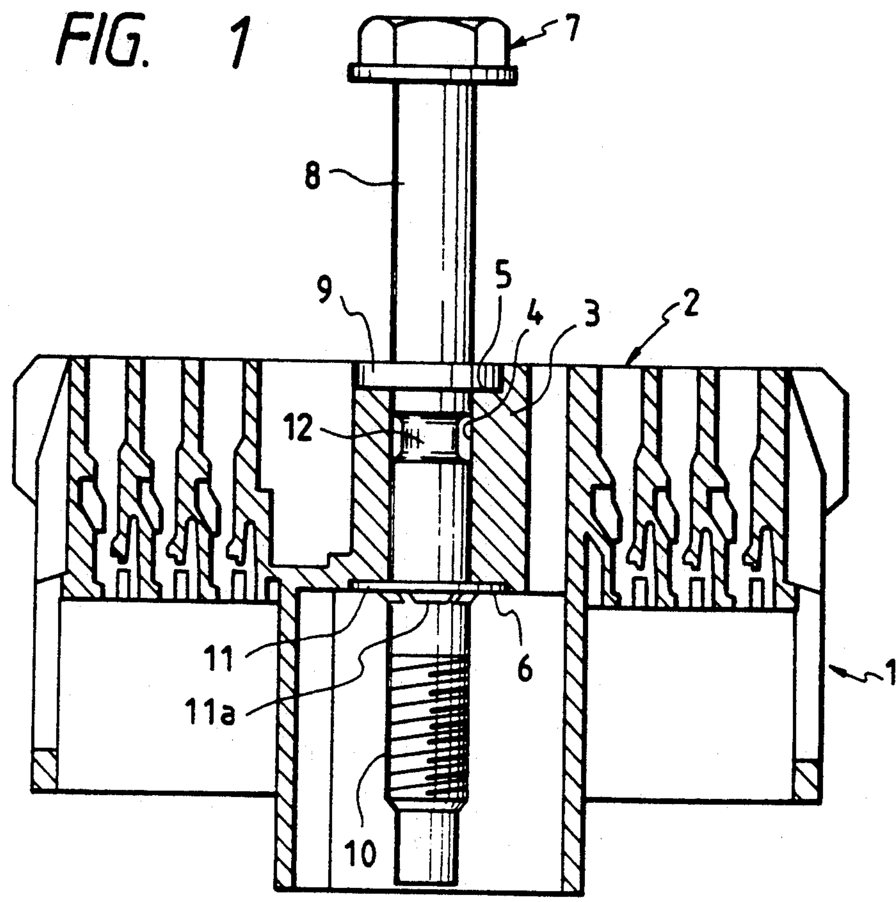
FIG. 1 is a vertical sectional view showing an example of a thread fastening type connector assembly, which constitutes a first embodiment of this invention.

The female connector, as shown in FIG. 1, includes a housing 2 having a bolt insertion hole 4 in its central portion 3. Opposite ends of the insertion hole 4 are countersunk to define recessed annular seats 5 and 6 respectively disposed in the outer and inner ends thereof. A bolt 7 is disposed within the bolt insertion hole 4. The bolt 7 has an annular depressing flange 9 integrally formed on the shank 8 so as to engage with the annular seat 5. A locking ring 11 with locking pawls 11*a* is mounted on the bolt 7 between the depressing flange 9 and the threaded portion 10 so as to engage with the recessed annular seat 6 formed at the inner end of the bolt inserting hole 4. The flange 9 in cooperation with the locking ring 11 act to retain the bolt in a predetermined axial position in the female connector. A breaking recess 12 is formed in the shank of the bolt 4 between the locking ring 11 and the depressing flange 9, to prevent the connectors from being tightened excessively.

As the bolt is tightened, the flange 9 pushes against the recessed annular seats 5 of the housing 2 directly, so that the female connector 1 is engaged with the male connector (not shown). That is, the force transmitted by the bolt 7 is directly applied to the housing 2, and therefore the female connector can be engaged with the male connector without the use of the conventional bolt holder. When the male and female connectors are disengaged from each other by turning the bolt 7 in the opposite direction, the locking ring 11 acts to pull the female connector 1 upwardly.

Figure 2:
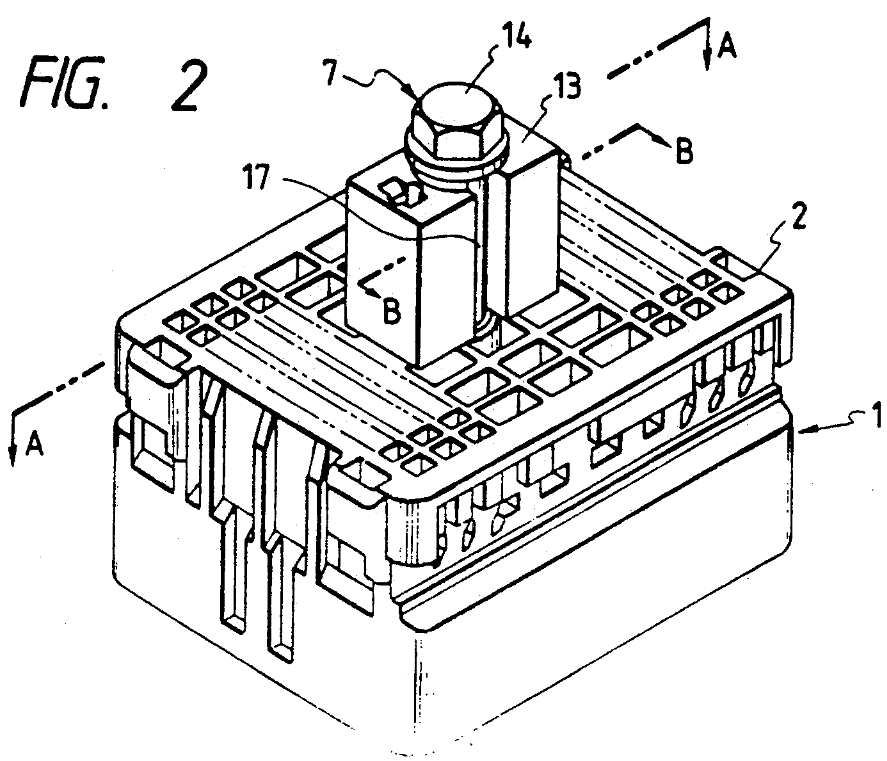
FIG. 2 is a perspective view showing another example of the thread fastening type connector assembly, which constitutes a second embodiment of the invention.
Figure 3:
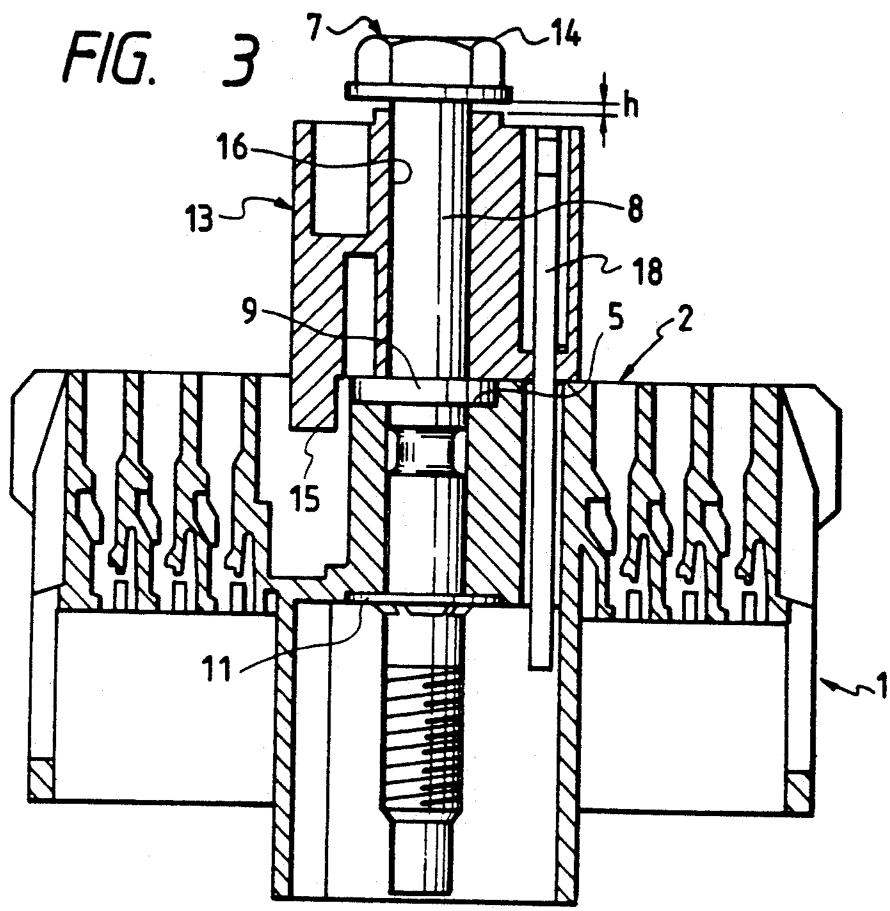
FIG. 3 is a sectional view taken along line A—A in FIG. 2.

A second embodiment of the invention is illustrated in FIGS. 2 and 3. As is apparent by comparing FIGS. 1 and 2, in the second embodiment, a bolt holder 13 is mounted on the above-described female connector 1. The bolt holder 13 is made of a relatively inexpensive synthetic resin such as polypropylene, and is mounted on the bolt 7 between the head 14 and the depressing flange 9. The bolt holder 13 has an engaging protrusion 15 extending from the bottom portion thereof which is received in the housing 2 so as to prevent the bolt holder from rotating relative to the housing.

Figure 4:
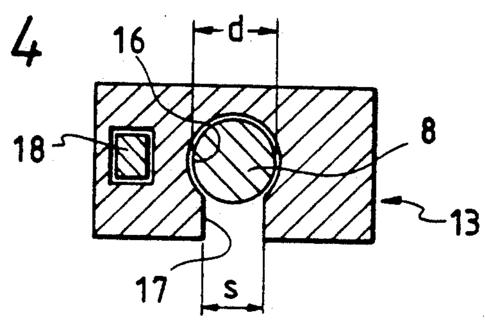
FIG. 4 is a sectional view taken along line B—B in FIG. 2, showing a bolt holder.

As shown in FIG. 4, which is a sectional view taken along line B—B in FIG. 2, the bolt holder 13 has a bolt hole 16, and a bolt insertion slot 17 which communicates with the bolt hole 16. The width (s) of the slot 17 is slightly smaller than the diameter (d) of the shank of the bolt 7. However, the bolt holder is sufficiently flexible to allow the bolt to be mounted thereto by pushing the shank 8 of the bolt through the slot 17. The tightening force is directly transmitted to the female connector through the depressing flange 9 so that the bolt holder 13 is not subjected to the tightening force. Rather, a small gap (h) is provided between the bolt head 14 and the bolt holder 13, as illustrated in FIG. 3. Due to the above described arrangement in the connector assembly according to this embodiment, unlike the conventional assembly, it is not necessary to provide the compression washer for the bolt head. It is noted that a connection engagement detection rod 18 is provided in the connector assembly, as shown in FIG. 3.

Figure 5:
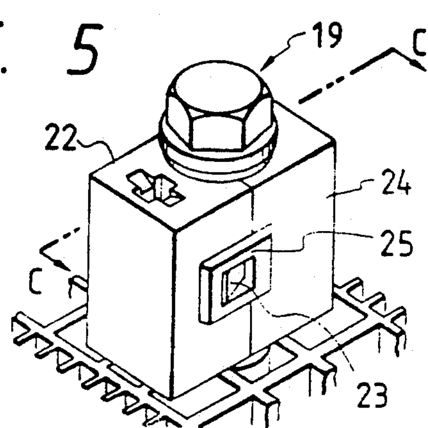
FIG. 5 is a perspective view showing another example of the bolt holder, which is employed in another example of the thread fastening type connector assembly, which constitutes a third embodiment of the invention.
Figure 6:
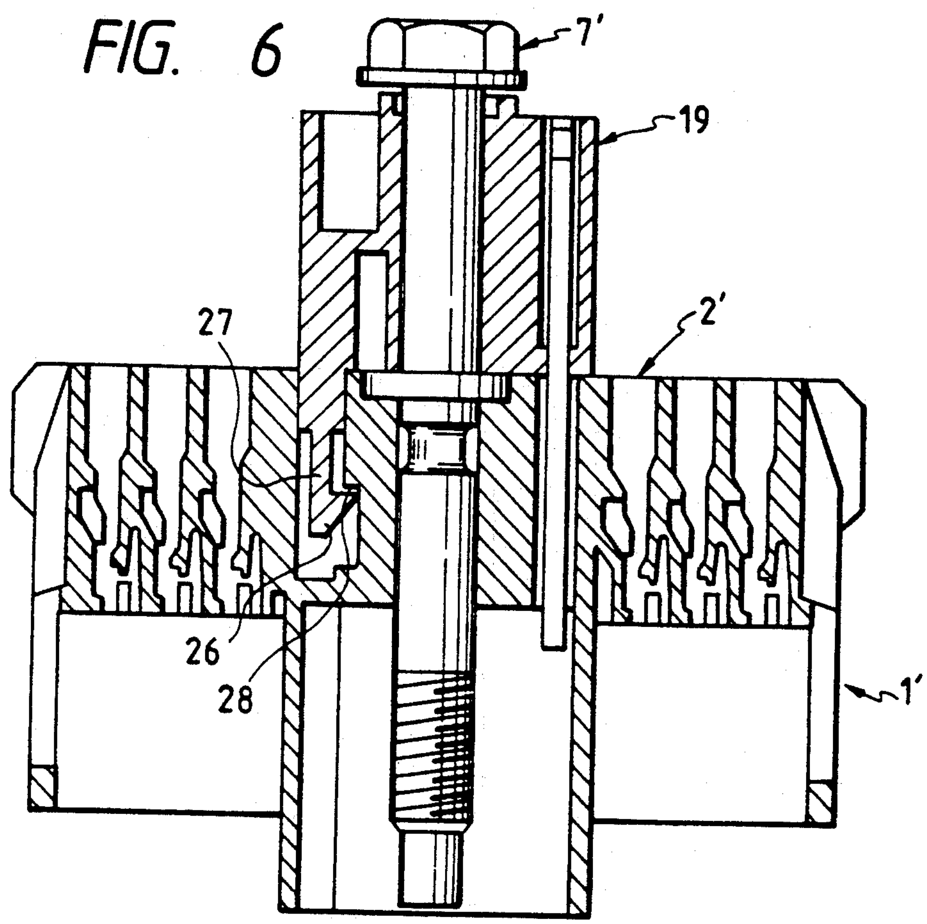
FIG. 6 is a vertical sectional view of the connector assembly with the bolt holder shown in FIG. 5.
Figure 7:
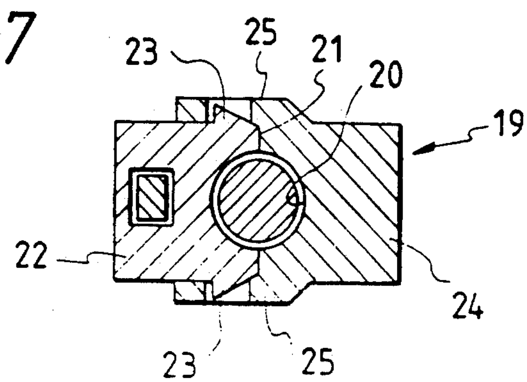
FIG. 7 is a sectional view taken along line C—C in FIG. 5, showing the bolt holder.
Figure 8:
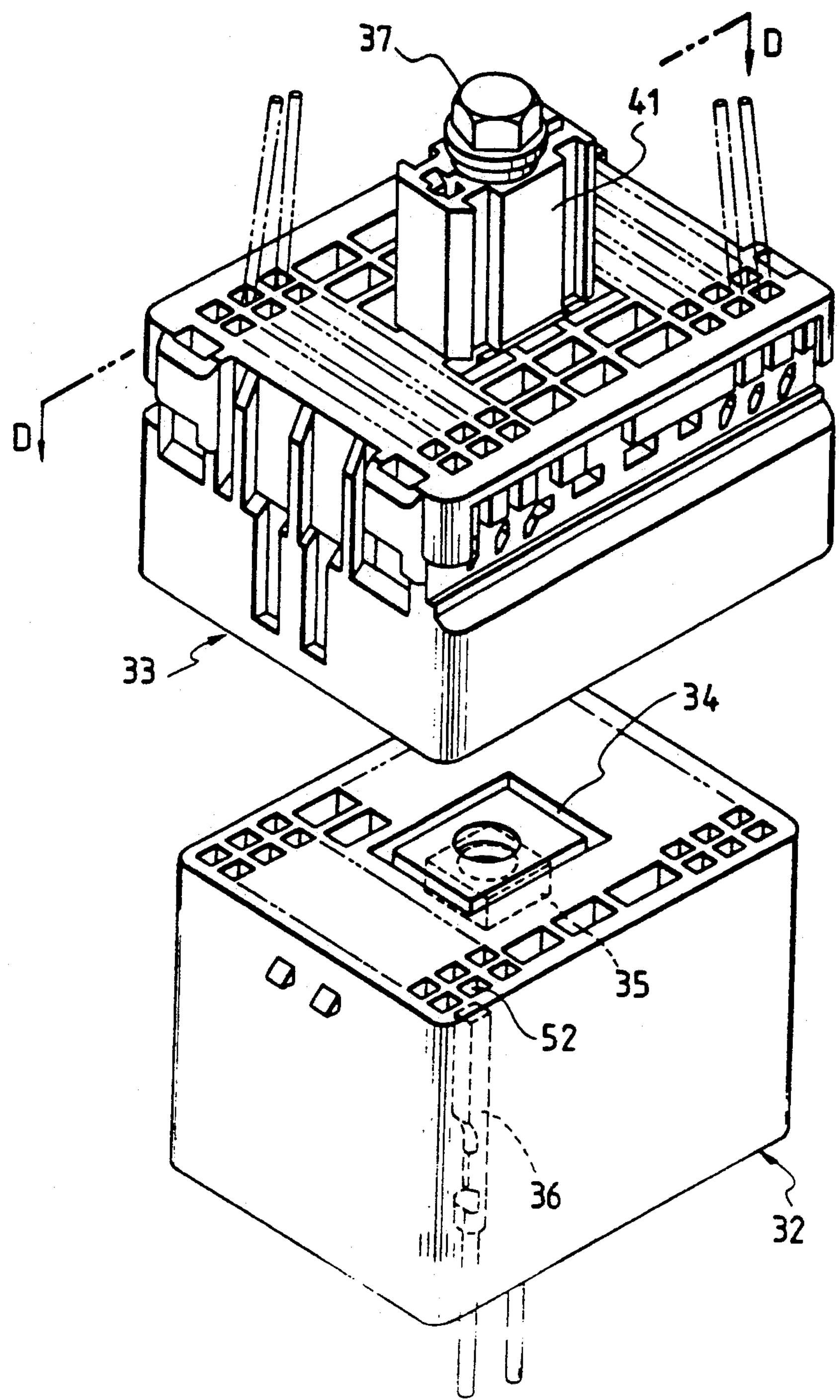
FIG. 8 is an exploded perspective view showing a conventional thread fastening type connector assembly.
Figure 9:
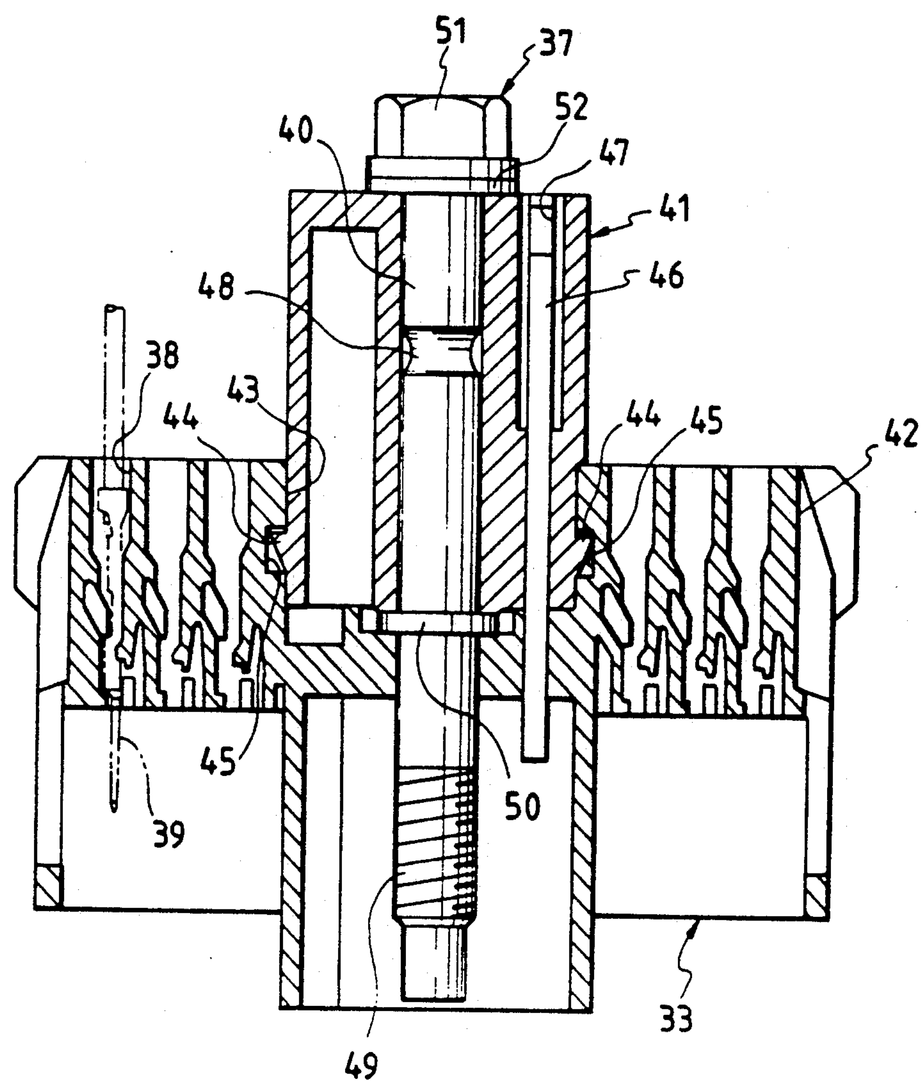
FIG. 9 is a sectional view taken along line D—D in FIG. 8.

A further embodiment of the bolt holder is shown in FIG. 5–7. The bolt holder 19, as shown in FIG. 7, which is a sectional view taken along line C—C in FIG. 5, is divided into left and right holder units 24 and 22 which, when mated together along line 21, together define a bolt hole 20. The left holder unit 22 has locking protrusions 23, 23 on both sides thereof, and the right holder unit 24 has engaging frames 25, 25 on both sides thereof which are respectively engaged with the locking protrusions 23, 23 so as to retain the two holder units together.

Further, as shown in FIG. 6, the bolt holder 19 has a flexible locking arm 27 extending from the bottom thereof. The locking arm 27 has a locking pawl 26 which engages an engaging step 28 formed in the housing 2′ of the female connector 1′. Therefore, the axial position of the bolt is fixed due to the depressing flange being retained between the top of the housing 2′ and the bottom of the bolt holder 19. Hence, in this embodiment, unlike the first embodiment (FIG. 1), it is not necessary to provide a locking ring 11 on the bolt 7′. When the male and female connectors are disengaged from each other by rotating the bolt in the opposite direction, the flexible locking arm 27 acts to pull the female connector 1′ upwardly due to the force transmitted from the depressing flange through the bolt holder to the female connector 1′. Therefore, it is preferable to provide at least one pair of flexible locking arms 27 having relatively large thickness on both sides of the bolt holder.

As is apparent from the above description, in the thread fastening type connector assembly of the invention, the bolt tightening force is not applied to the bolt holder, and therefore the latter may be low in mechanical strength; that is, it can be made of a relatively inexpensive material. This reduces the manufacturing cost of the connector assembly. Furthermore, the bolt holder is so designed as to have the bolt inserting slot, or to be dividable into two parts. Therefore, the bolt holder can be easily mounted on the bolt. In addition, unlike the conventional connector assembly, it is not necessary to provide the compression washer on the bolt near the head further decreasing the manufacturing cost.

While the invention has been described in connection with the preferred embodiments of this invention, it is understood that various changes and modifications may be made therein without departing from the invention, and it is aimed, therefore, to cover in the appended claims all such changes and modifications as fall within the true spirit and scope of the invention.

What is claimed is:

1. A threaded fastening type connector assembly, comprising:

a first connector housing having an internally threaded hole;

a second connector housing including an axially extending through hole substantially aligned with said threaded hole when said second connector housing is fitted with said first connector housing;

a bolt having a threaded portion and a shank portion and including a depressing flange fixedly disposed on said shank portion, said bolt being insertable into said through hole, wherein when said bolt is rotated in a tightening direction, said depressing flange abuts against said second connector housing to tighten said connector housings to each other; and a bolt holder mounted along said shank portion of said bolt between said depressing flange and a head of said bolt;

wherein the tightening force of said bolt is directly transmitted to the second connector housing through the depressing flange so that said bolt holder is free of the tightening force.

2. The connector assembly of claim 1, wherein said bolt holder has a bolt receiving hole and a slotted portion extending longitudinally thereof allowing said bolt to be received within said bolt receiving hole, a width of said slot being smaller that the diameter of said bolt.

3. The connector assembly of claim 1, wherein said bolt holder comprises:

a first half portion and a second half portion each including an arcuate longitudinally extending recess therein; and a locking device for locking said first and second half portions together with said recesses opposing one another to define a bolt receiving hole in which said bolt is retained.

4. The connector assembly of claim 3, further comprising means for fixedly securing said bolt holder to said second connector housing.

5. The connector assembly of claim 4, wherein said securing means includes a lock recess provided in said second connector housing and a locking arm, engageable with said lock recess, extending from said bolt holder.

6. The connector of claim 1, further comprising a detector for detecting complete engagement of first and second connector housings.

7. The connector of claim 4 wherein said detector includes a detecting rod slidably disposed within said bolt holder parallel to said bolt, wherein when said first and second connector housings are completely engaged with one another, said detecting rod protrudes from said bolt holder.

* * * * *